United States Patent [19]

Kadunce

[11] Patent Number: 4,629,529
[45] Date of Patent: Dec. 16, 1986

[54] METHOD AND MACHINE FOR CONVOLUTE OR SPIRAL WINDING OF COMPOSITE MATERIALS

[75] Inventor: Leo Kadunce, Morrisville, Pa.
[73] Assignee: Steeltin Can Corporation, Baltimore, Md.
[21] Appl. No.: 663,211
[22] Filed: Oct. 22, 1984
[51] Int. Cl.$^4$ .............................................. B05D 3/08
[52] U.S. Cl. ..................................... 156/428; 156/184; 156/195; 156/429; 156/446; 493/299; 493/301; 493/303
[58] Field of Search ................ 156/195, 425, 428–431; 493/299–302

[56] References Cited

U.S. PATENT DOCUMENTS

| | | | |
|---|---|---|---|
| 1,551,264 | 8/1925 | Palmer | 156/429 X |
| 3,243,328 | 3/1966 | Britton et al. | 156/195 |
| 3,252,388 | 5/1966 | Schur . | |
| 3,400,029 | 9/1968 | Mesrobian et al. | 493/301 X |
| 3,494,812 | 2/1970 | Cvacho | 493/301 X |
| 3,567,101 | 3/1971 | Ranne | 493/299 X |
| 4,479,835 | 10/1984 | Kutnyak | 156/429 X |

Primary Examiner—David Simmons
Attorney, Agent, or Firm—Cushman, Darby & Cushman

[57] ABSTRACT

An apparatus for continuously and sequentially forming cylindrical bodies from flat sheet material includes a rotating mandrel and an array of forming belts spaced along the mandrel for receiving and winding either continuous ribbon or discrete blanks of composite material about the mandrel to form a cylindrical body such as for a container and passing the formed body along the mandrel to a heat sealing means to seal the overlapping edges of the material; the array of belts are disposed to partially surround and run in contact with the mandrel and a gap is provided in the spiral path of the belts to permit continuous feeding of sheet material to the mandrel to enable continuous operation of the forming apparatus.

20 Claims, 20 Drawing Figures

METHOD AND MACHINE FOR CONVOLUTE OR SPIRAL WINDING OF COMPOSITE MATERIALS

BACKGROUND AND BRIEF SUMMARY OF THE INVENTION

The present invention relates to a method and apparatus for the circular and/or spiral winding of composite flexible material and more specifically, to the formation of a cylindrical body such as for a container from a treated blank, in a preferred embodiment, or which may be in continuous flexible sheet form.

In this field, devices have been employed to spirally wind ribbons of web-like material, often with the application of an adhesive, around a stationary mandrel with no more than two belts pulled around the mandrel and running at an angle to the axis of the mandrel. The web material is fed longitudinally between the mandrel surface and the belt or belts and pulled down the mandrel due to the relative rotation of the belt on a spiral path with respect to the axis of the mandrel. With this type of procedure, a continuous cylinder is formed which may be subsequently severed transverse to its axis to form discrete cylindrical containers. While this arrangement has been useful, it suffers from the disadvantage that it is relatively unstable due to the number of variables which adversely affect the control over the quality of the product produced.

In a method described as convolute, an adhesive is applied to portions of one or more sheets of flexible material and then the material is wound around a rotating mandrel along a feed direction that is at 90° to the axis of the mandrel. After the winding is completed, the formed cylinder is stripped from the mandrel for any additional process handling. The next sheet or sheets are then wrapped as the first sheet.

An apparatus and process similar to the foregoing is described in U.S. Pat. No. 3,252,388 where an adehsive coated blank is fed to a roll member where the adhesive is cured. The roll member is enclosed in a tube which serves to guide the blank into a cylindrical shape.

Apart from the difficulties associated with feeding an adhesive coated blank into a cylindrical path, this arrangement suffers from the obvious disadvantage that the sheet material must be completely formed into a cylinder on the roll or mandrel and moved off the mandrel before the next article can be processed.

In another arrangement, the blank forming of cylinder bodies from sheet material involves the steps of bringing a single sheet up and around a mandrel so that the adjacent edges of the blank align and overlap which are then bonded together in the area of overlap. This process is, of course, time consuming and labor intensive.

The present invention overcomes the foregoing disadvantages and provides substantially enhanced efficiency in forming either spirally wound cylindrical bodies or circularly wound cylindrical bodies in a continuous process where the sheet material, in either discrete sheet form or in continuous webs is continuously supplied to a forming mandrel and with completed cylindrical bodies continuously being sequentially delivered from the other end of the forming mandrel.

To achieve this end, the present invention includes an array of endless belts disposed along the length of the mandrel and which are arranged by separate sets of guide means to contact a portion of the periphery of the forming mandrel in a spiral path but which leave a gap to permit the continuous feeding of the discrete sheet material to the forming mandrel. Further, the mandrel and belts are rotated at predetermined relative speeds to assure accurate formation of the cylindrical body as well as transport of the formed body along the mandrel to the discharge end. With this invention, cylindrical bodies such as are used in the container industry which are made of composite material such as plastic films, foil and/or paper can also be formed into cylindrical bodies with either a circular wrap or a spiral wrap for the material constituting the body.

As has long been recognized, presently available spiral winding machines and their products suffer from a number of disadvantages. Regarding the machines, a very large number of variables must be controlled to produce uniform containers at production rates that have, in the past, been acceptable. Many of these variables, which number five to approximately seventy-five are described in an article entitled "Operating Variables in Spiral Winding: Theoretical Interrelationship and Significance" by Michael Harvey, TAPPI, Vol. 53, August 1970, p. 1521–24. The control of so many variables has inevitably limited the productive capacity of such machines thus contributing to the cost of the container bodies produced and rendering them less competitive in the container market.

In addition,, the prior art spiral winding machines required the cutting of the resulting tube to provide the discrete container bodies as well as the extensive application of a wet adhesive to the sheet material in the formation process. As a consequence, use of such machines has been restricted since the dust and debris from the cutting and adhesive application operations generally precluded use of these type of machines in food plants. Moreover, the containers produced often must undergo additional cleaning operations before their introduction into a food filling line.

While spiral wound paperboard containers are economically advantageous for some products, it has been recognized that the decreased resistance to axial compression inherent in such containers renders them unsuitable for a number of the products. With circular or convolute containers, the sheet fibers can be aligned to extend generally perpendicular to the ends of the container body thus affording much greater resistance to axial compression. Conversely, this feature will enable a manufacturer to use a lesser thickness in the sheet material thereby resulting in a reduction in the cost of the container. However, machines to produce circularly as opposed to spirally wound bodies have not provided the productive speeds required to compete with other types of container materials or with spirally wound bodies.

With the apparatus and method of present invention several of the control factors inherent in present methods of spiral winding sheet material are significantly reduced or eliminated while providing improved methods of winding capable of higher production speeds and improved control over the quality of the finished product. In addition, where the sheet material is fed transverse to the axis of the forming mandrel, significantly higher production speeds are achieved. The sheet material itself can be prepared in advance of being formed into a cylindrical body such as by the prior inclusion of liner material, label, printing, advertising and the like.

From the following description, it will be seen that the apparatus and method of the present invention will provide a rigid, convolute, gas-tight container which can be assembled at high speed from a blank of coated paperboard and where the apparatus can be easily and economically installed and operated by a filler due to the efficiency of the apparatus. With such an arrangement, the composite can manufacturing can be integrated into a filling line. Thus, the user of the apparatus will be able to form, fill and seal a container in an in line process thus resulting in substantial production savings without sacrificing production speeds, container integrity or appearance.

The foregoing and other advantages will become apparent as consideration is given to the following detailed description taken in conjunction with the accompanying drawings, in which:

BRIEF DESCRIPTION OF THE DRAWINGS

FIG. 7 is a schematic end view of the forming cylinder and feed mechanism of the present invention;

FIG. 8 is a schematic end view illustrating the wrapping procedure of the belt and sheet material about the mandrel;

FIG. 14 is a top plan view, with parts broken away for clarity, illustrating the feeding of the blanks to the mandrel and belts of the present invention; and FIGS. 15A–17B illustrate end views looking along the axis of the mandrel and showing the sequential dispositions of a blank as it is fed between the belts along the mandrel.

DETAILED DESCRIPTION OF THE INVENTION

Figure 1:
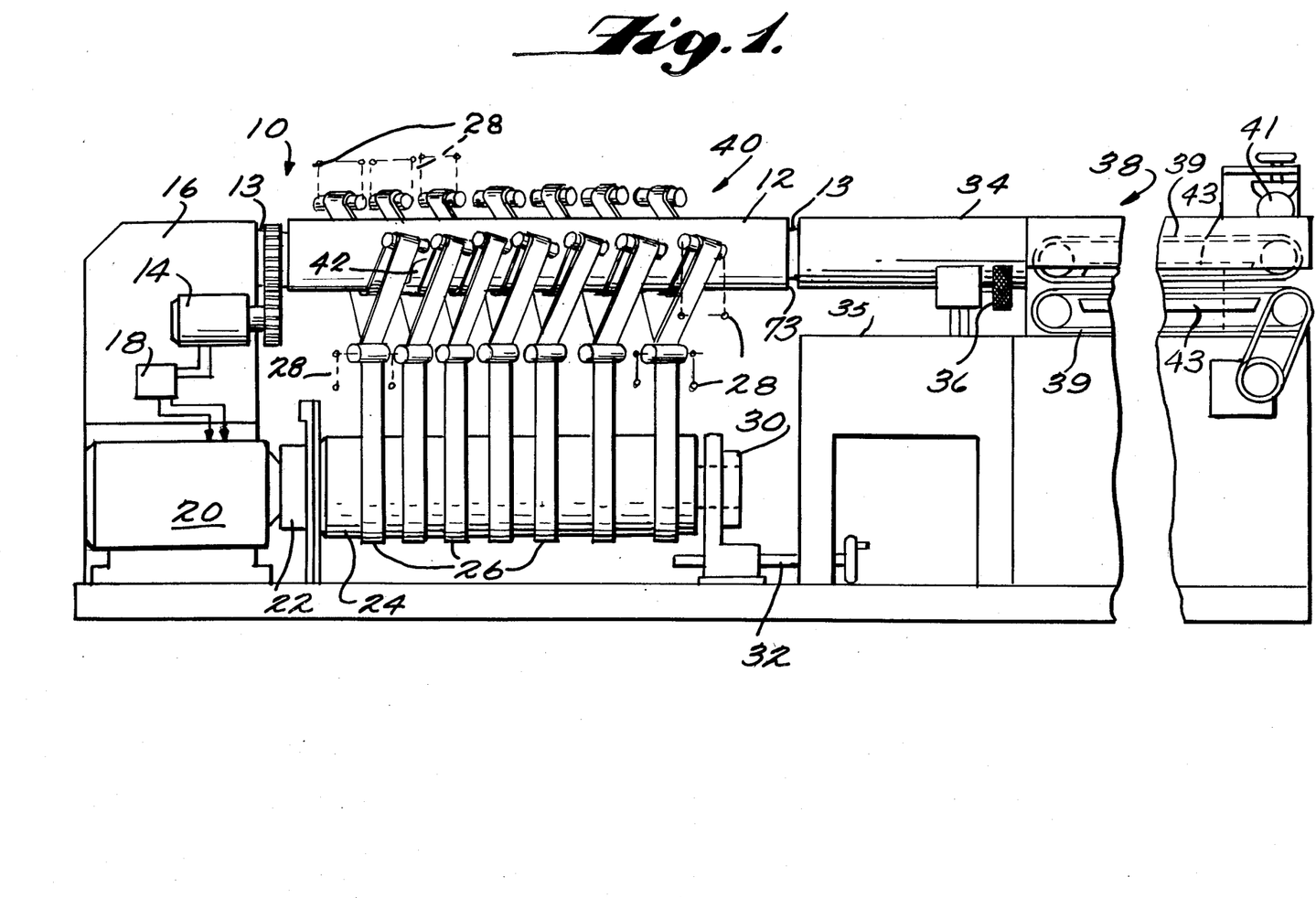
FIG. 1 is a side view in elevation of the apparatus of the present invention.

Referring now to the drawings wherein like numerals designate corresponding parts throughout the views, there is shown in FIG. 1 the apparatus 10 of the present invention which includes a forming mandrel 12 which is rotatably mounted on a fixed shaft 13. One end of mandrel 12 has a gear mounted thereon whereby the mandrel is rotated through the illustrated gears by a motor 14 controlled by a servo device 18 which also controls the output of motor 20. Motor 20 provides power through a transmission 22 to a belt drive roller 24 about which belts, some of which are indicated at 26, are partially wrapped. The other end of the belt drive cylinder 24 is mounted in an adjustable collar 30 which may be adjusted by means of a screw 32. The belts 26 are each provided with a set of guide means in the form of the illustrated rollers which are adjustably mounted in a cage or frame which is schematically indicated for some of the rollers at 28, the rest being omitted for the sake of clarity.

A stationary cylindrical shaft or collar 34 is in axial alignment with the longitudinal axis of the forming mandrel 12 and is mounted on and extends from the end of shaft 13. A stationary support member 35 is provided for an alignment motor and wheel 36 which operates to align the container body seams, as described below. Downstream of the unit 34 is a dual belt conveyor 38 which serves as a heat sealing means, later to be described.

Figure 2:
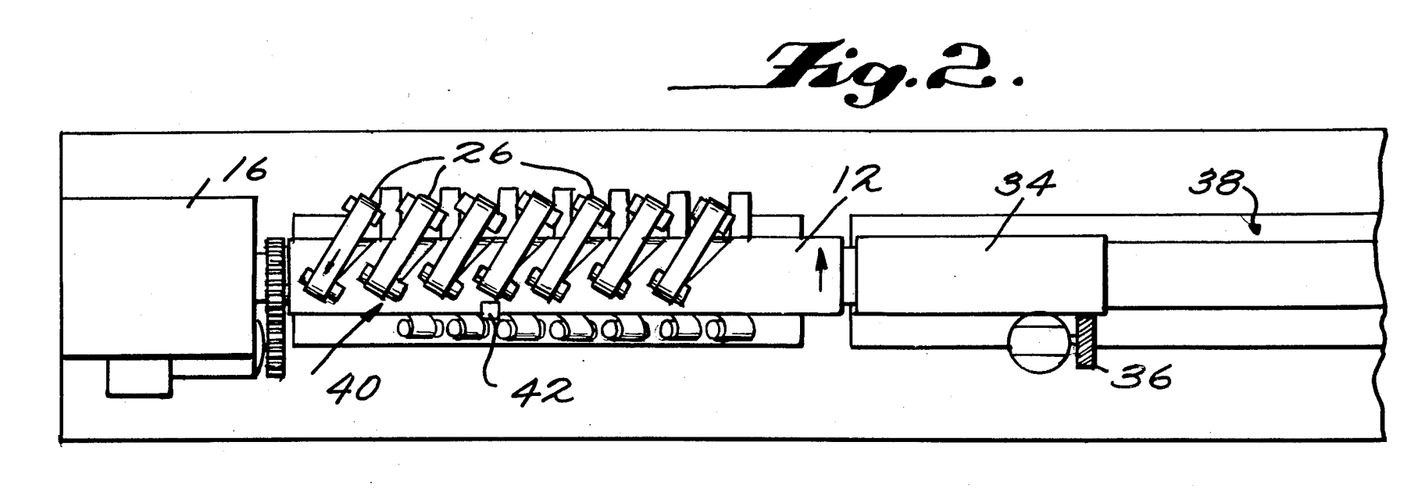
FIG. 2 is a top plan view of the apparatus of FIG. 1.

With reference to FIGS. 1 and 2, it will be seen that the belts 26 are partially wrapped in contact with the peripheral surface of the mandrel 12 in a manner to leave a gap, generally indicated at 40, along the length of the mandrel. From FIG. 3 it will be seen that the portion of the belts in contact with the mandrel 12 move in the same direction as the mandrel surface. Partway down the length of mandrel 12 a tucker member 42 is located which, as described later, assists in providing the desired overlap between the opposite ends of a segment of sheet material.

Figure 3:
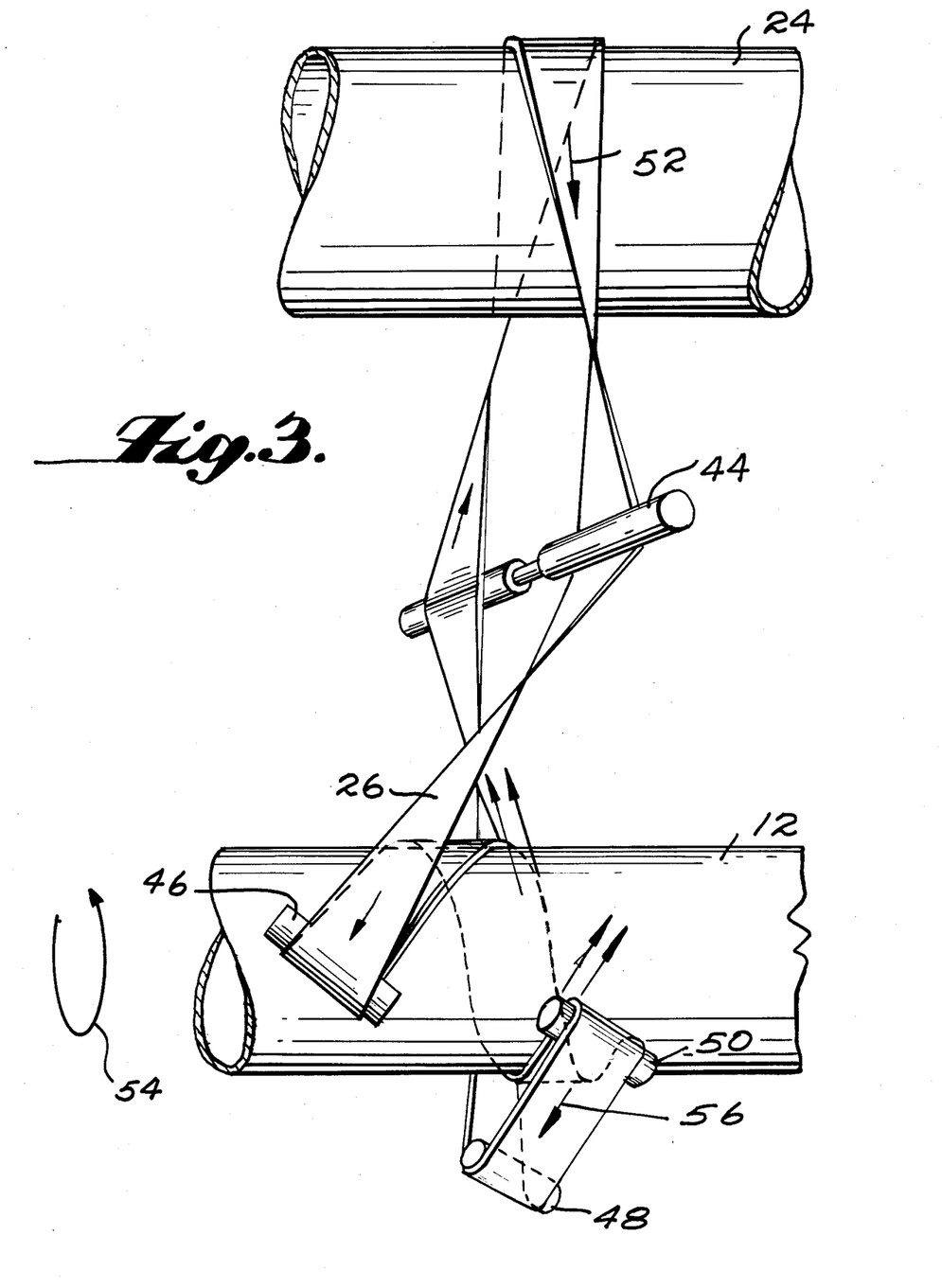
FIG. 3 is an enlarged detail view showing the path of one of the belts with respect to the mandrel according to the present invention.
Figure 9:
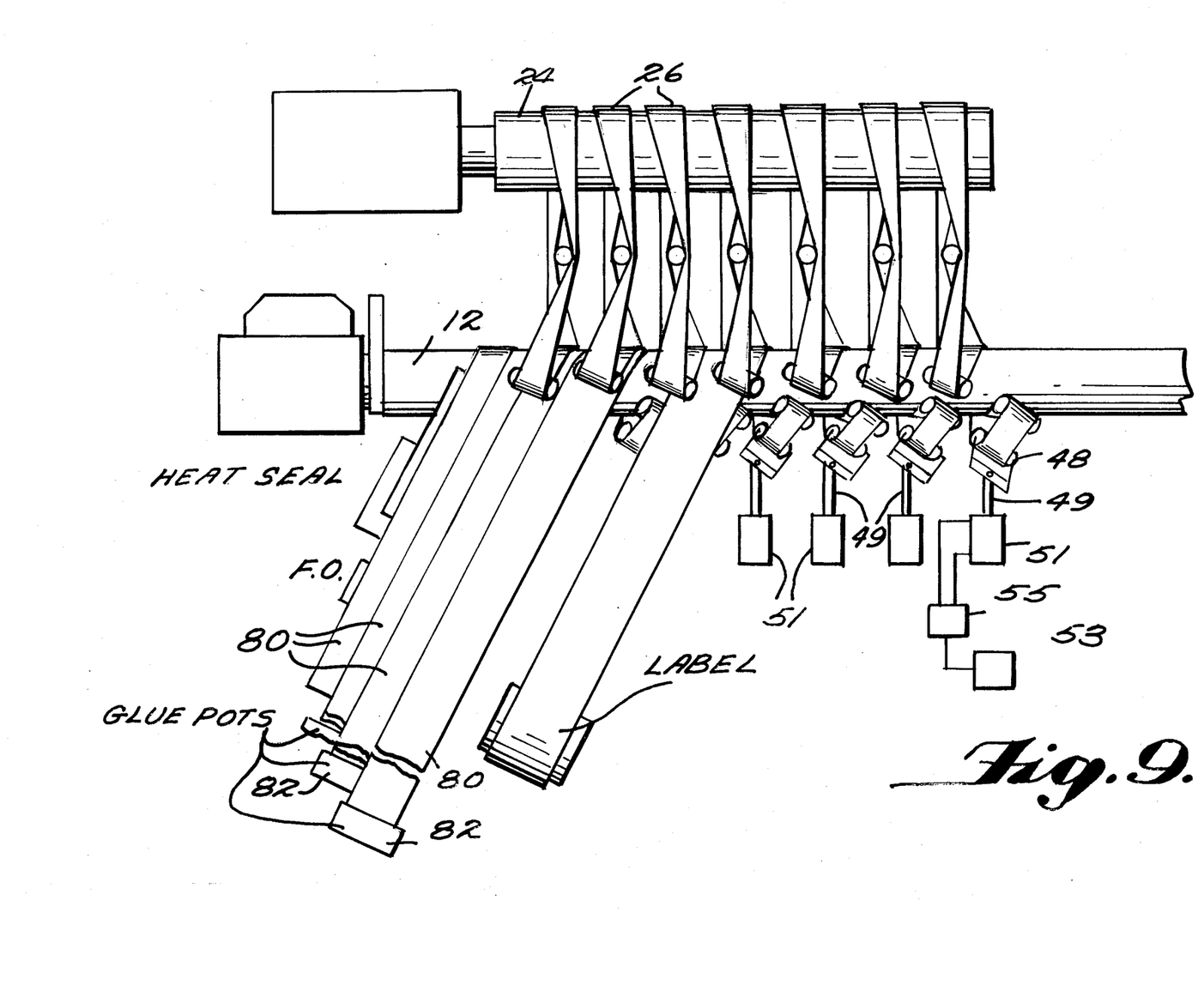
FIG. 9 is a top plan view of an alternate method for use of the apparatus of the present invention.

With reference now to FIG. 3, the guide means for each of the belts of the present invention will be described. Since the guide means are identical for each of the belts, the means for only one of the belts will be described, it being understood that this description applies to each of the belts of the array of FIGS. 1 and 2. The belt guide means includes a belt tracking bar 44 located approximately intermediate the belt drive roller 24 and the forming mandrel 12. In the vicinity of the forming mandrel 12, there is provided a first freely rotatable roller 46 which has a longitudinal axis that extends at an angle to the longitudinal axis of the mandrel 12. The angle that each of the rollers described herein makes with the axis of the mandrel is adjustable by any conventional means such as by providing bearing mounts for the individual rollers which themselves are adjustable in a number of directions such as by providing a universal swivel mount for each of the shafts of each roller. Roller 48 performs the function of a take up tension roller while roller 50, like roller 46 and in combination therewith, defines the partial spiral path of the belt 26 as illustrated. Each of the rollers 48 may be connected to a piston rod 49 of piston and cylinder 51 as schematically illustrated in FIG. 9. For each cylinder, air or other suitable fluid at a selected pressure is fed from a source 53 through a regulator 55 to each side of the piston in each cylinder 51. With this arrangement for each cylinder (only one being shown), the tension on each belt an be maintained nearly constant regardless of the thickness of the blanks and cylindrical bodies being formed.

Each belt leaves the surface of the drive roller 24, moving in the direction of arrow 52, passes around the tracking bar 44 and is rotated about its axis and then is passed about roller 46 whereupon the belt makes contact with the surface of the mandrel 12 and commences its partial spiral path moving in the direction of rotation of the mandrel 12 indicated at 54. The belt 26 then passes over roller 50 moving in the direction of arrow 56 and then over tension roller 48 from whence it passes back across belt tracking bar 44 to the drive roller 24. From the foregoing, it will be apparent that the spacing between the rollers 46 and 50 with respect to the longitudinal axis of the mandrel 12 will determine the magnitude of the angle of wrap of the belt about the mandrel 12. Since the external diameter of the forming mandrel 12 conforms to the final interior diameter of the cylindrical body being formed, it will be apparent that with substitution of different diameter mandrels 12, the belts can be easily adjusted to maintain the appropriate spiral path. The belts must, of course, contact the mandrel with a tension to feed the blanks around the mandrel.

Figure 4:
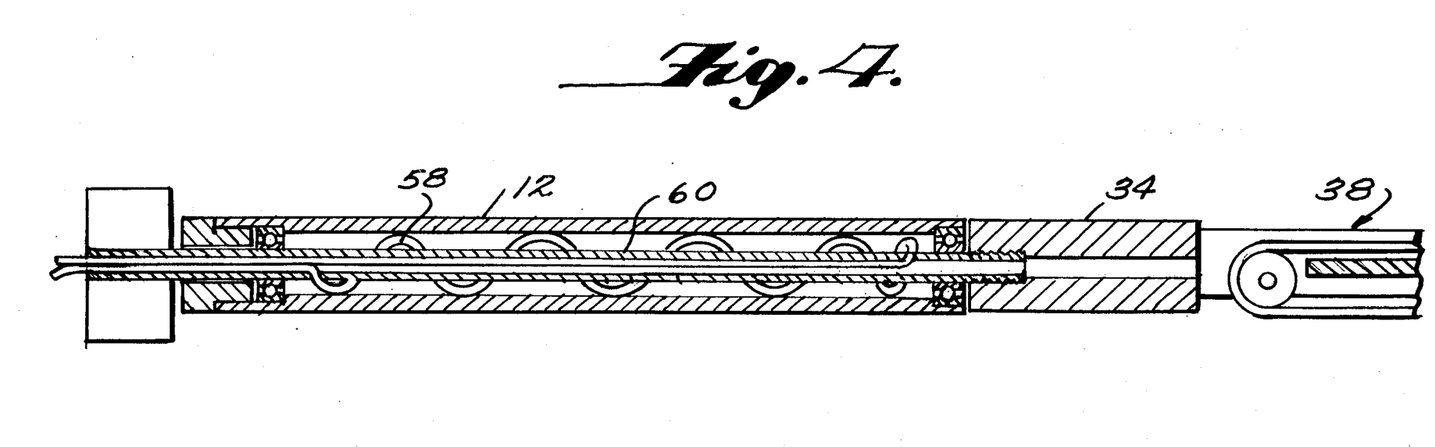
FIG. 4 is a sectional view of the mandrel.

With reference to FIG. 4, it will be seen that the interior of the mandrel may be provided with a treatment medium to treat the material of the cylindrical body being formed. For example, the internal conduit 58 may be disposed along a stationary axis member 60 and through which chilled or heated water may be passed to condition the surface of the mandrel as desired. This will facilitate production speeds particularly where the sealing medium used with the material of the bodies being formed requires such treatment while the sheet material is being formed into a cylindrical body.

Figures 5, 6:
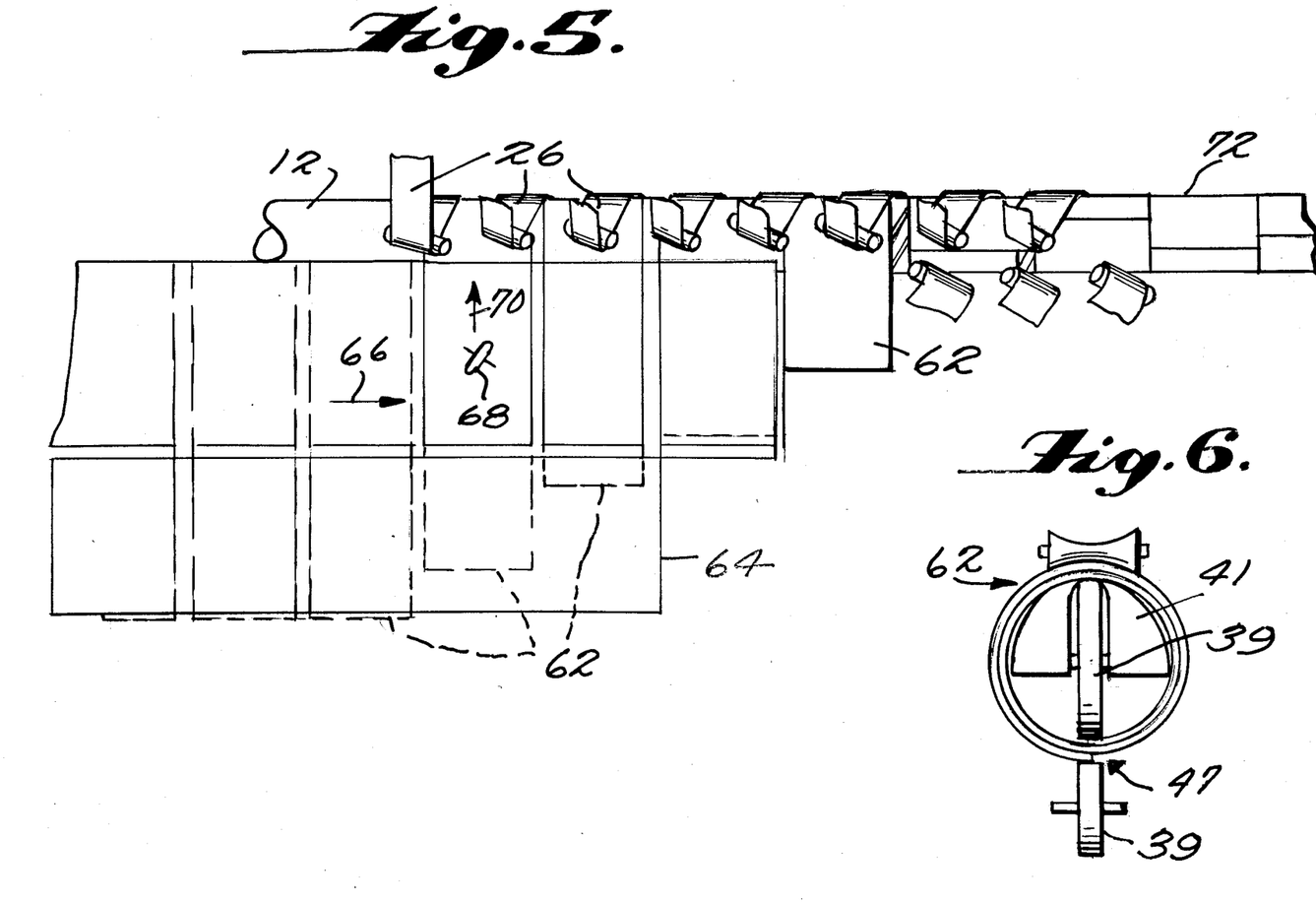
FIG. 5 is a top plan view with parts broken away showing the feed mechanism with respect to the mandrel of the present invention.
FIG. 6 is an end view in elevation of the heat sealing unit of the present invention.
Figure 13:
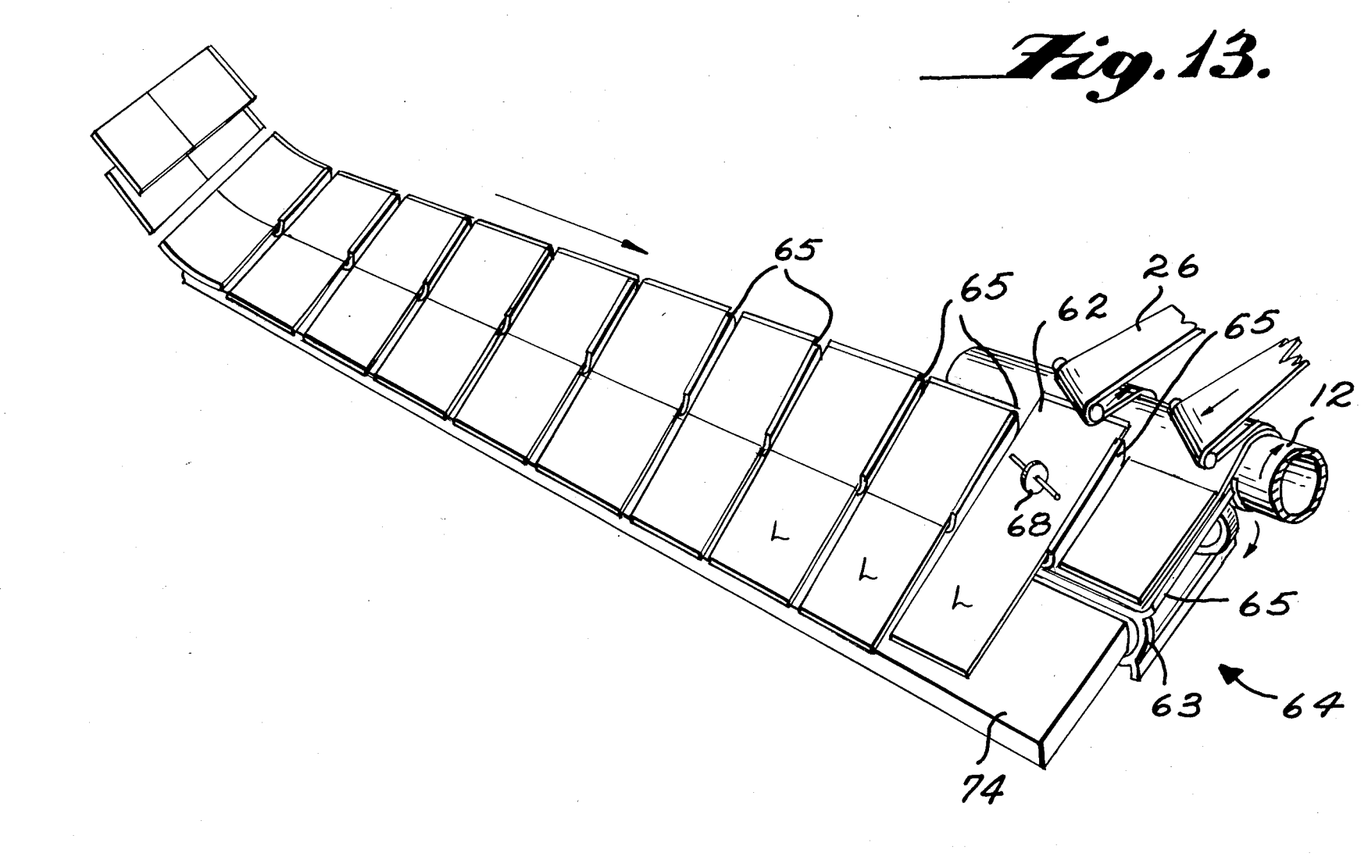
FIG. 13 is a perspective view showing a blank heater and conveyor.

With reference now to FIG. 5, there is illustrated one method of forming a cylindrical body according to the present invention. In FIG. 5, discrete rectangular flat sheets called blanks, 62 are fed on a heated conveyor table 64 in the direction of arrow 66. As illustrated in FIG. 13, the heater/conveyor table 64 includes a wide endless belt conveyor 63 or other suitably flexible conveyor having spaced aligning guide bars 65 attached to the external face of the conveyor 63. The conveyor is precisely aligned relative to the axis of the mandrel 12 so that in the illustrated embodiment the guide bars 65 will extend perpendicular to a plane that extends vertically through the axis of the mandrel 12. Extending alongside the conveyor 63 is a smooth surfaced table 74 a selected portion of which in the vicinity of the feed rollers encloses a heating unit. The length of the heating unit as well as its temperature will depend on the production speeds of the apparatus and the type of adhesive employed on the blanks 62. A number of heating devices may be usefully employed including electric, radio frequency and hot liquid heaters. Where the adhesive becomes tacky upon being heated, the outside edge 75 of the table 74 may be slightly raised to separate the underside of the blank 62 which faces the table 74 from the table. Other spacing means will occur for those skilled in this art.

As a blank reaches a position parallel to the first nip between the first belt and the surface of the mandrel, one of the rollers 68, 69 are activated to feed the blank to the mandrel through the gap 40. At this point, the belts grasp the leading edge of the blank and pull the blank around the surface of the mandrel. As the blank is being pulled about the mandrel, the belts also act to translate the blank axially along the mandrel. Where the conveyor 64 and belts are both in contact with the blank, it is important that the translation speed of the conveyor match the translation speed of the blank caused by the pitch angle of the belts in order to assure accurate cylindrical wrapping of the blank about the mandrel 12, that is, without skewing the ends of the blank. One means for achieving correlation of the translation speed of the conveyor is to provide the drive motor for conveyor 63 with a regulator such as a rheoshot or voltage regulator. Photoelectric sensing devices are available which could detect a skewed container, for example, at the sealing portion 38 or on collar 34 and effect correction of the relative speeds of the conveyor and belts.

In the vicinity of the first belt 26, the pair of feeding rollers are provided, one of which is indicated at 68, the driven wheel 69 (FIG. 7) being activated by a microswitch or other suitable sensor to rotate and feed the sheets in the direction of arrow 70, i.e., at 90° to the longitudinal axis of the mandrel 12 towards the gap in the spiral path of the belts on the mandrel 12 so that the leading edge of the sheet 62 has one edge contacted by the first belt 26 of the array while its opposite edge is contacted by the second belt of the array. As noted above, the belts will contact the sheet and take over the feeding of the sheet to wrap the material of the sheet about the periphery of the forming mandrel 12 and at the same time function to translate the sheet as it is being wrapped along the mandrel towards its discharge end 73. The velocity correlation must be maintained between the velocity of the belts 26 and the speed of the conveyor 63 at least as long as the sheet is in contact with the conveyor to effect uniform wrapping without skewing of the individual sheets as they are both wrapped and translated to the right as viewed in FIG. 5 along mandrel 12. The cylindrically formed sheets exit from the end of mandrel 12 fully wrapped in a cylindrical form as indicated at 72 and are transported on the collar 34 on which they are rotated when they come into contact with wheel 36 before being passed to the heat sealing conveyor 38.

With reference now to FIG. 7, a schematic end view of the feed mechanism is illustrated where it will be seen that on the conveyor table 64 on the outside thereof heating elements 74 may be provided to activate a heat sensitive adhesive that may be employed to seal the lapped edges of the sheet material as will be described below. It will be understood that the apparatus is capable of accommodating a number of different sealing substances as may be called for by the finished product. As shown in FIG. 7, as the sheet blank 62 is injected onto the mandrel 12, a microswitch indicated at 76 will be activated to operate motor 78 which in turn drives wheel 69 which, in cooperation with the weight of the wheel 68, firmly grips the sheet to inject it into the nip defined by the belt 26 and top of mandrel 12. Clearly, the upper injection wheel 68 may simply be idly mounted by any suitable means to bear against the top of the sheets.

As shown in FIG. 8, a guide means in the form of a tucker member 42 is disposed downstream of the first belt so that the by the time the sheet material passes the tucker member 42, it has been wrapped at least twice around the mandrel to form a double walled cylindrical body. In other applications, a single wall container can also be formed. The tucker member 42 is in the form of a metal curved plate that maintains the first wrap in contact with the surface of the mandrel as the second wrap of the sheet material about the first wrap is being effected. This is achieved by properly spacing the undersurface of the tucker member 42 taking into consideration the thickness of the sheet material being wrapped.

While the foregoing has involved a description of a circular wrap of discrete sheet material about the mandrel to form a cylindrical body, the apparatus of the present invention can also be employed to provide a spiral wrap as described below in connection with FIG. 9.

With reference now to FIG. 9, the same elements of the apparatus are employed in substantially the same configuration. However, as shown in FIG. 9, continuous ribbons 80 of flexible sheet material are supplied from rolls (not shown) and which may have their undersides coated with glue by appropriately disposed glue pots 82 before the sheet material is fed to the gap between the belts 26 along the mandrel 12. Unlike the previous embodiment, the ribbons 80 intersect the longitudinal axis of the mandrel at an included angle that is between 0° and 90° and, preferably, is within the range of 30° to 60°. In this method, and with the apparatus illustrated, a continuous length tube is formed with staggered wraps of ribbon material 80 to form a continuous cylindrical body of any desired axial length. As mentioned above in connection with FIG. 4, the interior of the mandrel may be conditioned to activate or cure the adhesive supplied by the glue pots so that a finished product is obtained ready for cutting in any desired length to form spirally wrapped cylindrical bodies.

Figures 10, 11, 12:
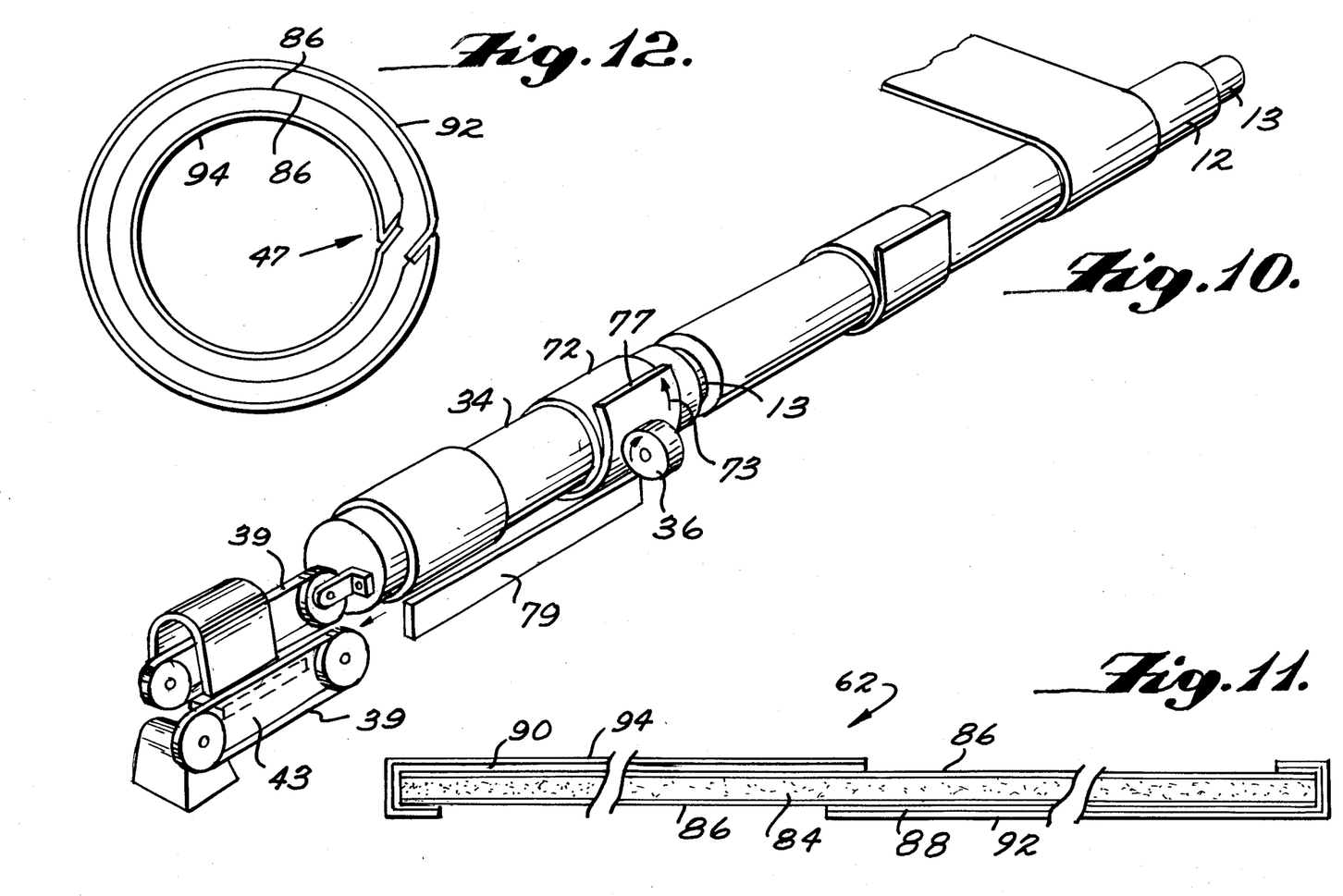
FIG. 10 is a perspective view of the forming mandrel and sealing mechanism of FIG. 4 with parts deleted for clarity.
FIG. 11 is a side view of a blank of the present invention.
FIG. 12 is an end view of a formed cylindrical container body.

Referring now to FIG. 10, there is shown an arrangement for rotating and aligning the seam of the cylindrical body 72 on the fixed shaft 34 downstream of the mandrel 12. As an individual cylindrical body 72 is pushed by a following formed body onto the shaft 34, the soft rubber rotating wheel 36 will rotate the body 72 in the direction of arrow 73 until the leading edge 77 abuts against the stop plate 79. As shown in FIG. 5, the bodies 72 will actually be in end-to-end relationship as they come off of the mandrel 12. Upon accumulation on the shaft 34, the leading cylindrical body 72 will be caught in the heating element belts 39. The belts 39 are preferably metal belts which are heated preferably by juxtaposed heating plates 43 so that the temperature to which the seam indicated at 47 is subjected between the belts will be of sufficiently high temperature to fuse the particular adhesive being employed in the vicinity of the seams 47. With reference to FIG. 6, it will be appreciated that the belts may be so located on the respective pulleys to exert a pressure on the material of the container in the vicinity of the seams 47 sufficient to form a fluid tight seal. Also, about a portion of the upper belt 39 a guide saddle 41 is provided over which the formed blanks are fed. Where the overlapping edges are provided with a vinyl coating, the heat seal should be effected at a temperature of between 400° and 500° F.

With reference now to FIG. 11, there is shown, greatly enlarged a composite blank 62 of the present invention. The blank 62 includes a core 84 of fibrous or paper sheet material which is coated on both sides with a thin layer of a heat activated adhesive 86 such as polyethylene. On one side and overlapping one end a foil layer 88 is applied which may carry label information. Overlapping the opposite edge and a portion of the opposite face a layer 90 of a metal foil such as aluminum sheet is applied and bonded to the polyethylene as is the label layer 88. Overlying the layers 88 and 90 are respective vinyl coatings 92 and 94 with the vinyl coatings also overlapping the opposite edges of the blank 62. As noted previously, before the blank 62 is fed to the mandrel 12, the top and bottom surfaces thereof are exposed to heat from heater 74 which will render the adhesives 86 sufficiently tacky so that when the blank 62 is wrapped about the mandrel 12, the surfaces 86 will adhere to one another as illustrated in FIG. 12. Where the opposite ends of the blank 62 are coated with a vinyl adhesive or a vinyl film the heat from the devices 74 may be adjusted so that these edges do not seal. However, the belts 39 will impart sufficient heat and pressure so that the overlapping edges or seams will take the position as illustrated in FIG. 12. Normally a pressure of from 70 to 80 psi will be applied to the seam 47 to result in the seam configuration shown in FIG. 12. Where the contents of the container to be formed are liquid, it is preferable to use the polyethylene on surfaces of the blank 62 that are not exposed to the product while it is useful to use the vinyl on the remaining surfaces since the vinyl will not migrate when heated and will function to seal the container edges in combination with the foil layers.

When used with the apparatus of the present invention, a superior container body will result and one which can be manufactured at greatly increased production speeds since a substantial number of the variables that were normally encountered in spiral winding of a container body are entirely eliminated. Further, very simple adjustments of the apparatus can be effected to obtain precisely wound cylindrical bodies. In this regard, it is useful that the conveyor translation is correlated with the belt 26 translation of the blank and that the mandrel rotates at a slightly slower speed than the belts 26.

The belt speed will, of course, control the speed of the takeup of the blanks from the conveyor as well as the speed of movement of the formed blanks down the mandrel towards the fixed shaft 34. For an approximately 4 inch diameter container body, the belts may be driven at a speed of 30 revolutions per minute while the mandrel will be rotated in the direction indicated at from 28 to 29 revolutions per minute. A number of devices will occur to those skilled in this art for controlling the relative speeds of the belts, the mandrel and the feed conveyor in addition to the voltage regulator 18 suggested herein which controls the speed of the motor 14 relative to the speed of the belt drive motor 20. By properly regulating the speeds, the coefficient of friction will be substantially reduced between the cylinder body being formed and the mandrel thus contributing to increased production speeds.

Figures 14, 15A, 16A, 17A:
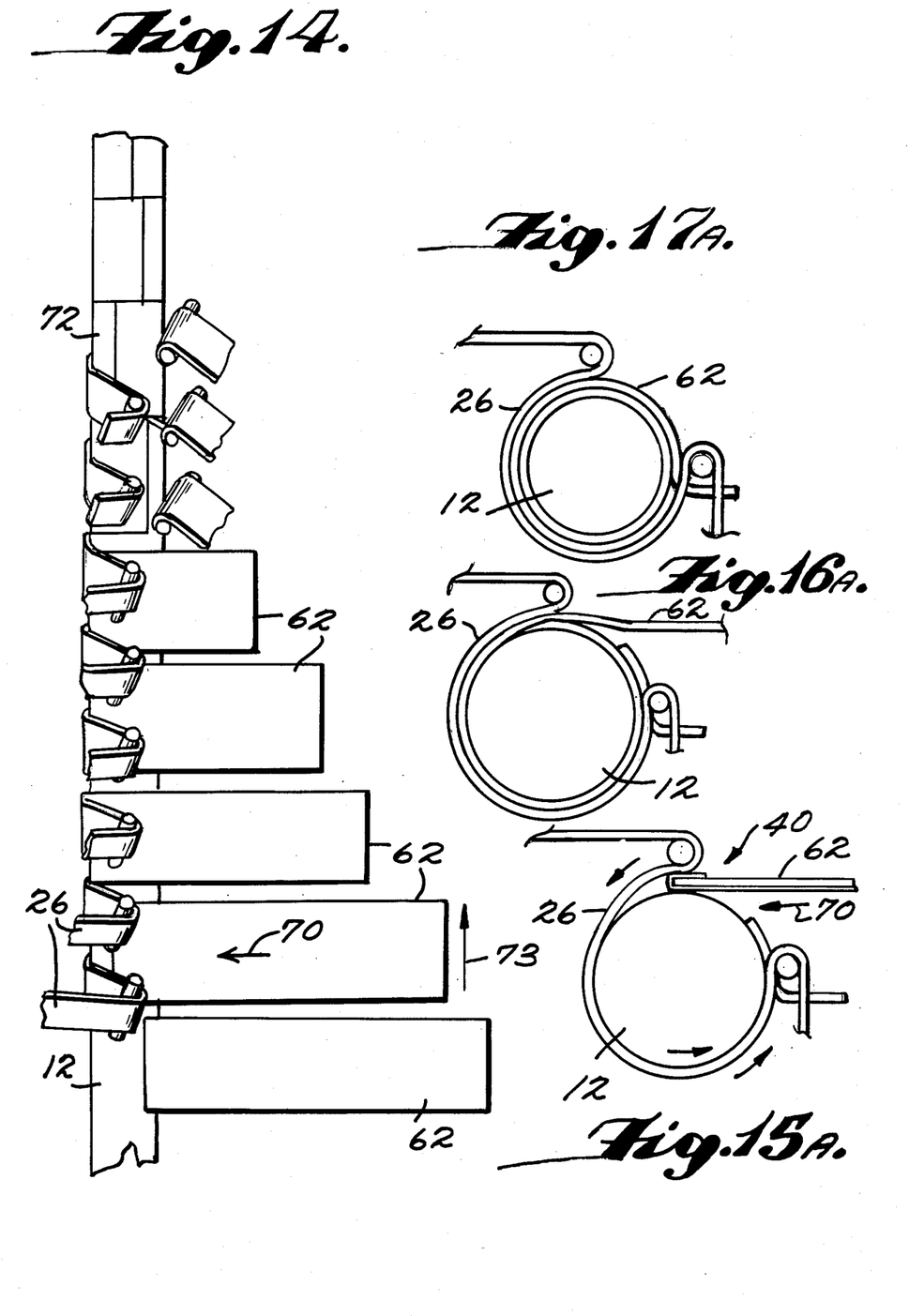
Figure 15B:
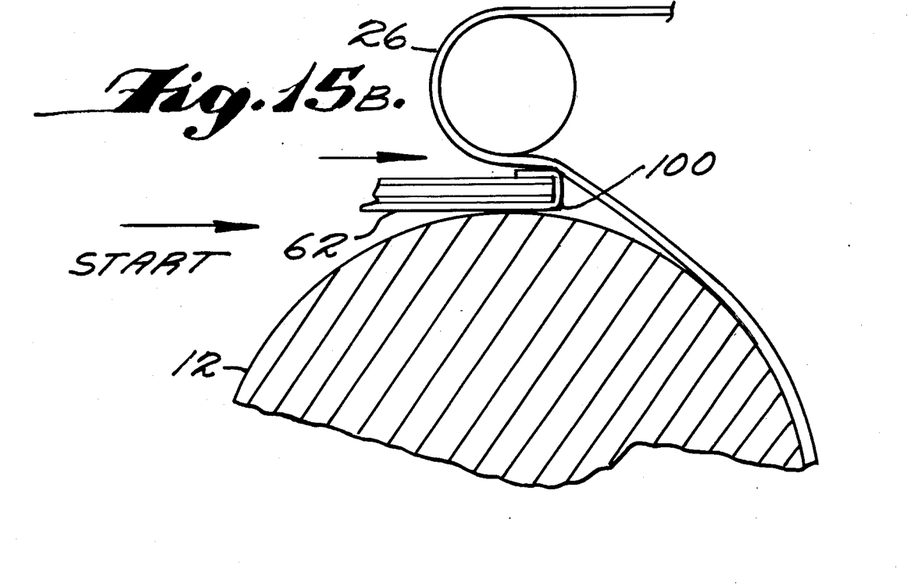
Figure 16B:
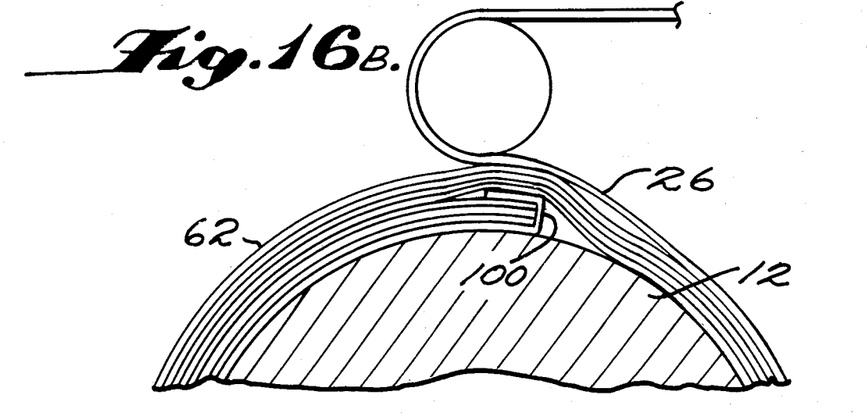
Figure 17B:
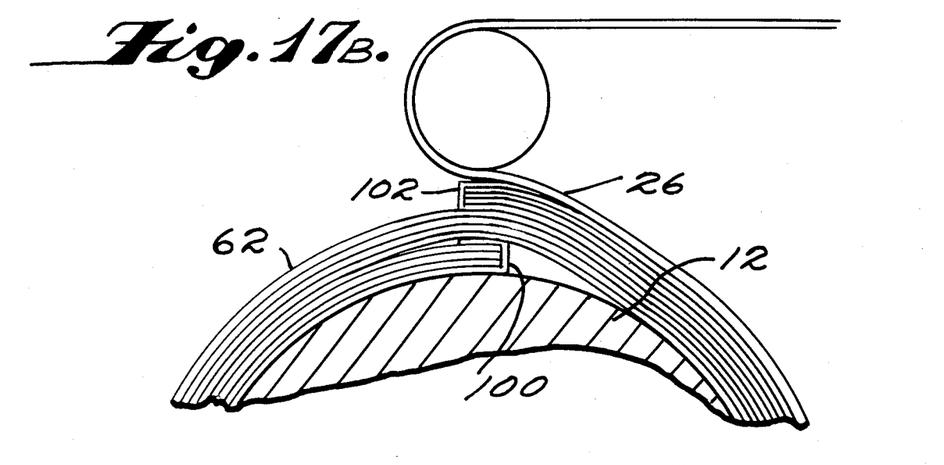

To assist in the visualization of the process steps of the present invention, reference will now be had to FIGS. 14 through 17B. FIG. 14 is a view similar to FIG. 5 showing the sequential feeding of blanks 62 to the mandrel 12 with the blanks being fed in the direction of the arrow 70 and being delivered from the belts as formed cylinders 72 at the other end of the mandrel 12. As shown in FIG. 15A, a blank 62 is fed into the gap 40 defined by the rollers for the belts 26 up to the point where the blank 62 contacts the belt 26 at a peripheral edge of the mandrel 12. While the conveyor 63 (FIG. 13) continues to feed the blanks in the direction of arrow 73 the belts 26 grab the leading edge of the blank 62 and commence wrapping the blank 62 about mandrel 12 as shown in FIG. 16A. As the blank is translated parallel to the axis of the mandrel 12, the wrapping of the blank 62 about the peripheral surface of the mandrel 12 continues until the wrap is completed as illustrated in FIG. 16A. As previously noted, correlation must be maintained between the translational speed of the conveyor 63 and the speed of the belts 26 to guard against skewing of the blank as it is wrapped about the peripheral surface of the forming mandrel 12. As can be seen in FIGS. 15B, 16B and 17B, which are views upstream of the direction of movement of the blanks 62, it will be seen that with a properly selected diameter for the mandrel 12 and length for the blank 62, the leading and trailing edges of the blank 100 and 102 may, with the present invention, be precisely overlapped to a selected degree to ensure an efficient sealing of the overlapping edges to form a leakproof cylindrical container.

From the foregoing, it will be apparent that the present invention provides a versatile apparatus and method for efficiently producing in a continuous manner, without interruption, cylindrical bodies of any desired interior diameter or wall thickness and which can be easily modified to employ any material of a flexible nature in either continuous or discrete sheet form as well as any sealing mechanism or means for adhering the surface of the sheet material together.

The present invention also provides a number of definite advantages and features in the resulting product, as for example, improved resistance to compression in the vertical direction as well as improved sealing characteristics for moisture resistance.

Having described the invention, it will be apparent to those skilled in this art that various modifications may be made thereto without departing from the spirit and scope of this invention as defined in the appended claims.

What is claimed is:

1. An apparatus for forming a cylindrical body from a substantially flat, flexible sheet material comprising:
   mandrel means having a longitudinal axis and a peripheral surface,
   means for feeding the sheet material to said mandrel means with the sheet material having a leading edge and a trailing edge and with the leading edge oriented in a selected manner relative to said longitudinal axis of said mandrel means,
   endless belt means with said belt means having means for guiding said belt means along a selected path extending from a belt drive means to a selected portion of said mandrel means and for guiding said belt means along a substantially spiral path along a selected portion of the longitudinal axis of said mandrel means where said belt means is in contact with the surface of said mandrel means through a partial spiral wrap of less than 360 degrees about said mandrel means, said substantially spiral path of said belt means including a gap for receiving sheet material from the feeding means so that a sheet material fed to said mandrel means at a selected angle with respect to said longitudinal axis will be engaged by said belt means and formed into a cylindrical body on said mandrel means;
   said sheet material being a rectangular blank having a straight leading edge, said means for feeding including transport means for feeding the blank to said gap substantially transverse to the longitudinal axis of said mandrel.

2. The apparatus as claimed in claim 1 including means for rotating said mandrel means about said longitudinal axis at a selected speed.

3. The apparatus as claimed in claim 1 wherein said endless belt means includes an array of endless belts with each said belt being spaced from an adjacent belt of said array, said means for guiding including frame means for each said belt, at least some of said substantially spiral paths of said belts including said gap for receiving sheet material.

4. The apparatus as claimed in claim 1 wherein said means for feeding the sheet material to said mandrel means includes a conveyor and means for heating at least a portion of said sheet material while said sheet material is being carried by said conveyor.

5. The apparatus as claimed in claim wherein means for sealing portions of the sheet material together when in the form of a cylindrical body are provided.

6. The apparatus as claimed in claim 5 wherein said sealing means includes means for applying pressure to the cylindrical body in the vicinity of the heat sealant.

7. The apparatus as claimed in claim 3 wherein said guide means include a plurality of rotatable rollers for each belt of said array, with said rollers being disposed along the path of each belt so as to control the spiral path of each associated belt.

8. The apparatus as claimed in claim 1 wherein guide means for the sheet material is provided adjacent to a portion of the mandrel surface to maintain at least a portion of the leading edge of the sheet material in contact with the mandrel surface.

9. The apparatus as claimed in claim 4 wherein said conveyor includes a guide member for each said sheet material carried thereby for guiding a said sheet material as said sheet material is fed from said conveyor into said gap so that a said sheet material will be maintained in a selected orientation to said axis of said mandrel means while said sheet material is being fed into said gap.

10. An apparatus for the continuous forming of cylindrical bodies from substantially-flat flexible sheets at a relatively-high production rate, comprising a frame means, a mandrel means supported within the frame means and having a longitudinal axis, at least one moving belt means guidingly supported within the frame means and having at least a portion thereof disposed substantially in a spiral path around an axial portion of the mandrel means and said path including a gap for receiving the sheets, means for driving the belt means, and means for continually feeding the sheets in sequence transversely of the longitudinal axis of the mandrel means and into said gap, the feeding means including conveyor means arranged to simultaneously transport each sheet in a direction substantially parallel to the longitudinal axis of the mandrel means as the sheets are fed transversely into said gap in timed relationship to the means for driving the belt means, thereby maintaining the alignment of the finished cylindrical body.

11. The apparatus of claim 10, further including means for rotating the mandrel means in the direction of the belt means.

12. The apparatus of claim 11, further including means for rotating the mandrel means at a predetermined rpm which is slightly less than the rpm of the belt means.

13. The apparatus of claim 10, wherein the belt means includes an array of substantially similar endless belts spaced from each other along the longitudinal axis of the mandrel means.

14. The apparatus of claim 10, further including a stationary mandrel aligned substantially coaxially with the mandrel means for receiving the cylindrical bodies in sequence, take-off conveyor means for removing the cylindrical bodies from the stationary mandrel, and sealing means associated with the take-off conveyor means for sealing the longitudinal seam formed in each cylindrical body.

15. The apparatus of claim 14, wherein the sealing means comprises a pair of heating belts arranged substantially parallel to each other and to the longitudinal axis of the mandrel means, one of the heating belts being disposed within the cylindrical body longitudinally along the seam thereof, and the other heating belt being disposed outside of the cylindrical body longitudinally along the seam thereof.

16. An apparatus for the continuous forming of hollow cylindrical bodies from substantially-flat flexible blanks at a relatively-high production rate, comprising a frame means, a cantilever-supported mandrel journaled within the frame means and having a longitudinal axis, an array of substantially similar endless belts spaced from each other along the longitudinal axis of the mandrel and guidingly supported within the frame means, each of the belts having a portion thereof disposed substantially in a spiral path around respective axial portions of the mandrel and said path including a gap for receiving the sheets, means for driving the array of belts, means for driving the mandrel in the direction of the belts and at a relative rpm, means for continually feeding the blanks in sequence transversely of the longitudinal axis of the mandrel and into said gap, the feeding means including a conveyor means arranged to simultaneously transport each blank in a direction substantially parallel to the longitudinal axis of the mandrel as the blank is fed transversely into said gap and in timed relationship to the driving means for the belt, the arrangement being such that the conveyor means maintains alignment of the finished cylindrical body as the blank being formed is moved longitudinally of the mandrel and past at least the first belt, thereby forming a continuous series of cylindrical bodies, each having a longitudinal seam, a stationary mandrel at the end of the rotating mandrel and substantially aligned coaxially therewith for receiving each cylindrical body, and a take-off conveyor for removing each cylindrical body from the stationary mandrel and including means for sealing the longitudinal seam in each cylindrical body.

17. An apparatus for the continuous forming of cylindrical bodies from substantially-flat flexible blanks at a relatively-high production rate, comprising a frame means, a mandrel means supported within the frame means and having a longitudinal axis, an array of substantially similar endless belts spaced from each other along the longitudinal axis of the mandrel and guidingly supported within the frame means, each of the belts having at least a portion thereof disposed to contact an axial portion of the mandrel means along a selected path and said path including a gap for receiving the blanks, means for driving the belts, means for continually feeding the blanks in sequence transversely of the longitudinal axis of the mandrel means and into said gap, the feeding means including conveyor means arranged to simultaneously transport each blank in a direction substantially parallel to the longitudinal axis of the mandrel means as the blanks are fed transversely into said gap in timed relationship to the means for driving the belt means, the arrangement being such that the conveyor means maintains alignment of the finished cylindrical body as the blank being formed is moved longitudinally of the mandrel and past at least the first belt, and wherein the remaining belts move the blank being formed longitudinally of the mandrel, thereby forming a continuous series of cylindrical bodies, each having a longitudinal seam, means for removing the cylindrical bodies from the mandrel means, and means for sealing the longitudinal seam in each cylindrical body.

18. A method of continuously forming a series of hollow cylindrical bodies from sheets of material comprising the steps of providing a mandrel means having a longitudinal axis, providing an array of endless belts spaced from one another along the longitudinal axis of the mandrel means, wherein each of the belts has a portion thereof arranged substantially spirally of a respective axial portion of the mandrel means and including a gap for receiving the sheets, driving the belts at a predetermined rpm, continually feeding sheets of material in sequence transversely of the longitudinal axis of the mandrel means and into said gap, simultaneously transporting the sheets in a direction substantially parallel to the longitudinal axis of the mandrel means in timed relationship to the rpm of the belts, thereby forming a continuous series of hollow cylindrical bodies, each of which has a longitudinal seam, removing the cylindrical bodies in sequence from the mandrel means, and sealing the longitudinal seam of each cylindrical body.

19. The method of claim 18, further including the step of rotating the mandrel in the direction of the belts and at a speed relative to the rpm of the belts.

20. The method of claim 18, further including heating the sheets prior to feeding the sheets between the belts and the mandrel means.

* * * * *